United States Patent
Spillane et al.

(10) Patent No.: US 9,132,515 B2
(45) Date of Patent: Sep. 15, 2015

(54) WELDING FIXTURE CLAMP

(71) Applicant: Automation Services, LLC, Bloomfield Hills, MI (US)

(72) Inventors: Alexander F. Spillane, White Lake, MI (US); Bryan H. Voss, Warren, MI (US); Rodney D. Phillips, Mussey, MI (US)

(73) Assignee: Automation Services, LLC, Bloomfield Hills, MI (US)

( * ) Notice: Subject to any disclaimer, the term of this patent is extended or adjusted under 35 U.S.C. 154(b) by 145 days.

(21) Appl. No.: 13/973,188

(22) Filed: Aug. 22, 2013

(65) Prior Publication Data

US 2014/0054357 A1    Feb. 27, 2014

Related U.S. Application Data

(60) Provisional application No. 61/691,836, filed on Aug. 22, 2012.

(51) Int. Cl.
    *B23K 37/04* (2006.01)
    *B25B 5/00* (2006.01)
    *B25B 5/04* (2006.01)

(52) U.S. Cl.
    CPC ......... *B23K 37/0408* (2013.01); *B23K 37/0435* (2013.01); *B25B 5/00* (2013.01); *B25B 5/04* (2013.01)

(58) Field of Classification Search
None
See application file for complete search history.

(56) References Cited

U.S. PATENT DOCUMENTS

| | | | | |
|---|---|---|---|---|
| 4,504,725 A | * | 3/1985 | Beneteau | 219/86.25 |
| 5,046,706 A | * | 9/1991 | McNamara et al. | 269/32 |
| 5,252,801 A | * | 10/1993 | Angel et al. | 219/86.61 |
| 6,706,990 B1 | * | 3/2004 | Olsson | 219/86.21 |
| 6,875,945 B2 | * | 4/2005 | Knauff et al. | 219/90 |
| 6,927,357 B2 | * | 8/2005 | Schmidt et al. | 219/89 |
| 2008/0078748 A1 | * | 4/2008 | Binder et al. | 219/90 |
| 2009/0071943 A1 | * | 3/2009 | Kilibarda | 219/86.25 |
| 2010/0025383 A1 | * | 2/2010 | Tiberghien | 219/119 |
| 2010/0257912 A1 | * | 10/2010 | Tiberghien et al. | 72/305 |
| 2012/0193855 A1 | * | 8/2012 | Takahashi | 269/32 |

OTHER PUBLICATIONS

Applicant Admitted Prior Art: General Motors, Dated: pre-2000.

* cited by examiner

*Primary Examiner* — Devang R Patel
(74) *Attorney, Agent, or Firm* — Brooks Kushman P.C.

(57) ABSTRACT

A welding fixture clamp includes a stationary clamp jaw having a first guide surface and a pivotal clamp jaw having a second guide surface. The second guide surface slides relative to the first guide surface as the pivotal clamp jaw pivots about the pivot axis. Side shields are secured to one of the pivotal clamp jaw and the stationary clamp jaw to extend over the other one of the pivotal clamp jaw and the stationary clamp jaw to shield the first guide surface and the second guide surface from weld splatter and debris. A pivot pin connects the side shield to the stationary clamp jaw and operatively connects the pivotal clamp jaw to the stationary clamp jaw to pivot about the pivot axis.

17 Claims, 5 Drawing Sheets

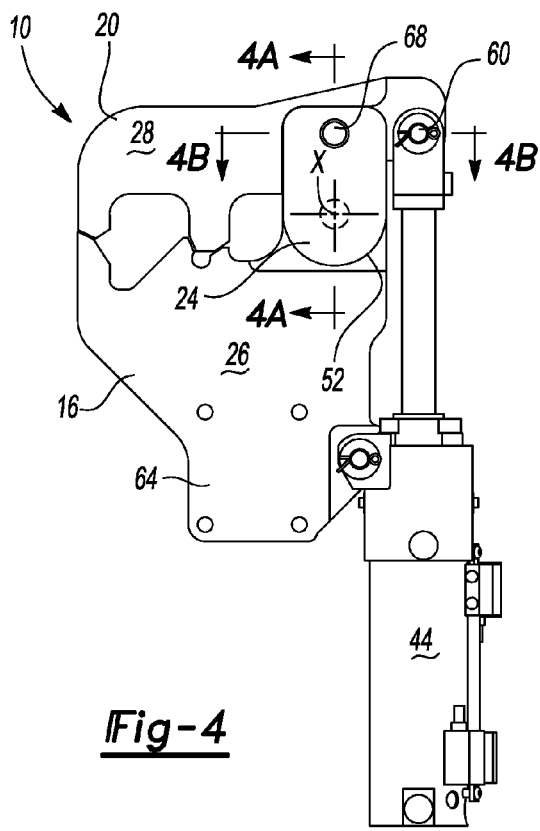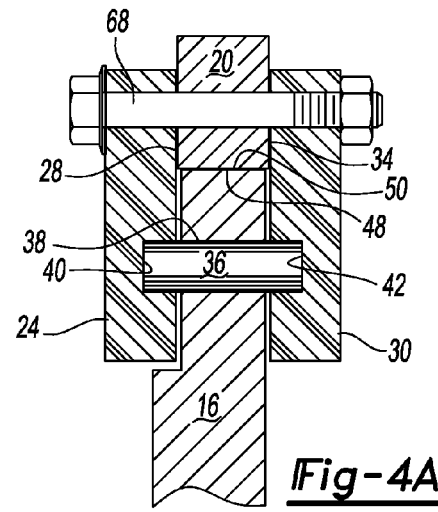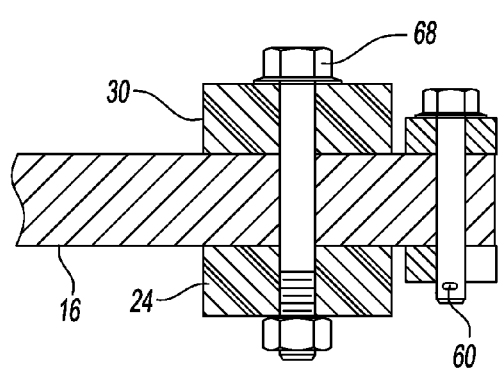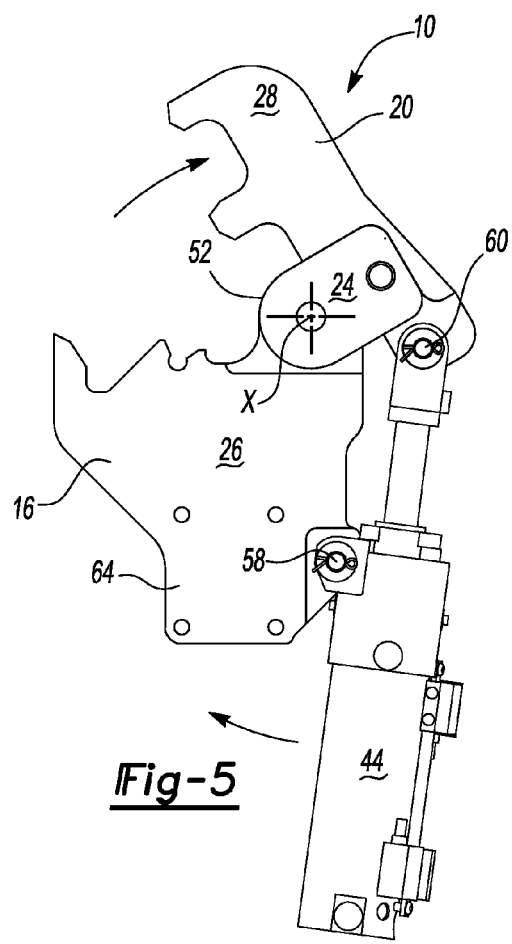
Fig-4
Fig-4A
Fig-4B
Fig-5

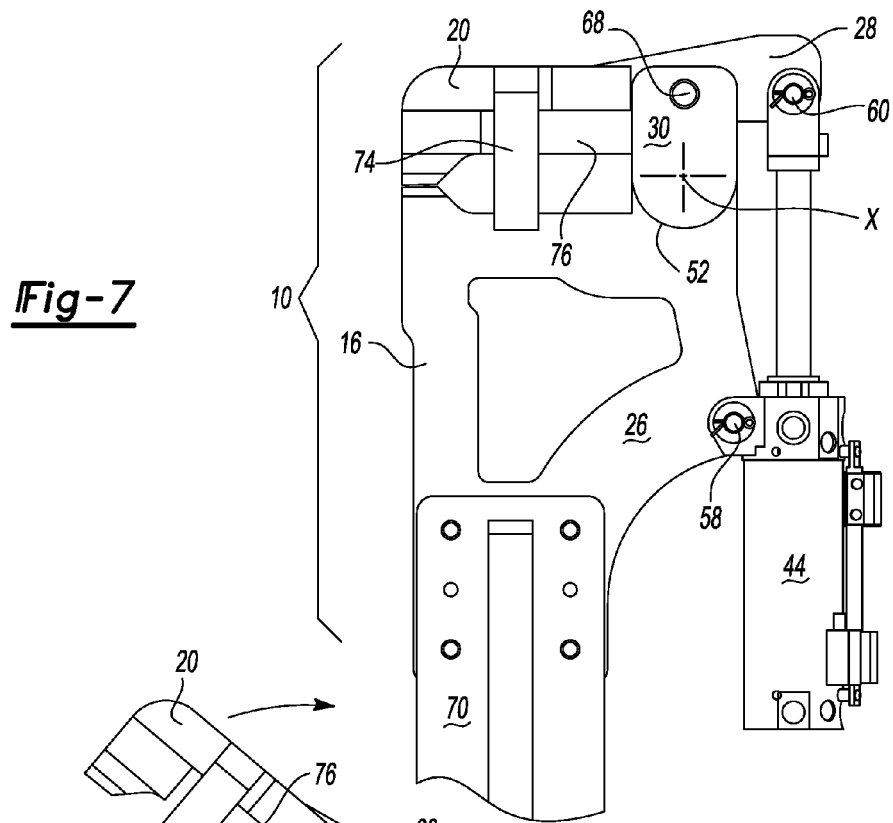
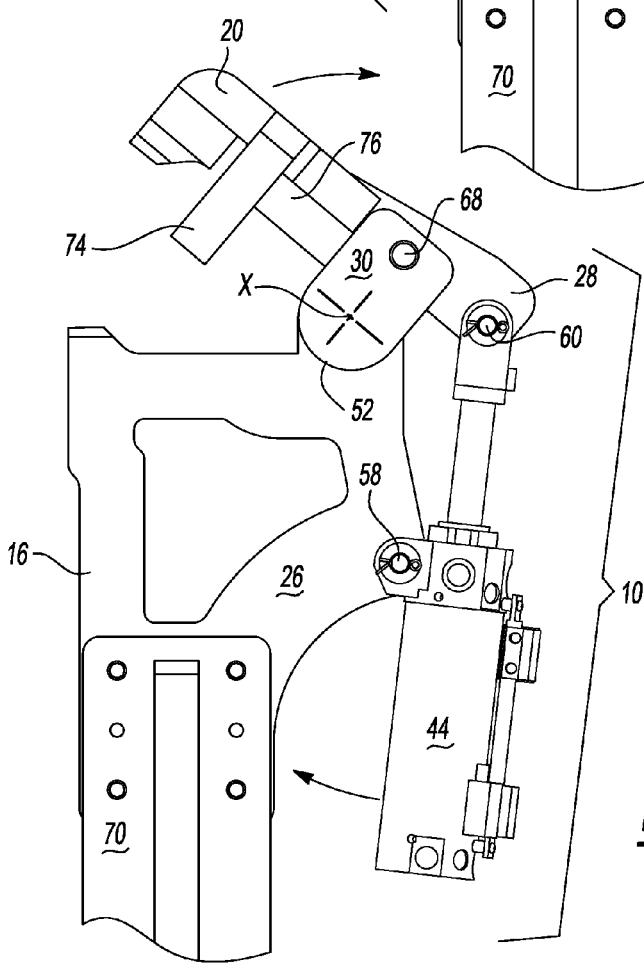

WELDING FIXTURE CLAMP

CROSS-REFERENCE TO RELATED APPLICATIONS

This application claims the benefit of U.S. provisional application Ser. No. 61/691,836 filed Aug. 22, 2012, the disclosure of which is hereby incorporated in its entirety by reference herein.

TECHNICAL FIELD

This invention disclosure relates to automation clamps that are used to hold sheet metal parts together while welding operations are performed.

BACKGROUND

Automation clamps generally have two clamping jaws that are opened and closed by a hydraulic or pneumatic cylinder. In operation, the jaws are opened to load and unload parts and closed to hold the parts together as they are welded. Some welding processes typically produce weld splatter that accumulates on anything that is in the vicinity of the welding operation. Accumulations of weld splatter can interfere with the operation of automation clamps and can interfere with opening and closing the clamps.

Automation clamps and mounting brackets are traditionally fabricated from metal plates. Weld splatter fuses to the metal plates and is difficult to remove from the surface of the plates. Pivot points on metal automation clamps may become fouled by weld splatter and debris and may require servicing or replacement. Problems and service interruptions caused by automation clamps can result in expensive downtime and costly repairs.

End effector automation clamps are attached to robot arms to reach in and hold parts together. The weight of metal automation clamps requires robots that are specified to perform operations with the load capacity to manipulate the clamps. The cost of automation systems may also be reduced by using robots that have lower weight capacities if the weight of automation clamps can be reduced.

This disclosure is directed to solving the above problems and other problems relating to automation clamps.

SUMMARY

According to one aspect of this disclosure, a welding fixture clamp is provided that has a stationary clamp jaw that includes a first guide surface and a pivotal clamp jaw that includes a second guide surface that conforms to at least a part of the first guide surface. At least one side shield is secured to or provided on one of the pivotal clamp jaw and the stationary clamp jaw to extend over the other one of the pivotal clamp jaw and the stationary clamp jaw to shield the first guide surface and the second guide surface from weld splatter and debris. A pivot pin connects the side shield to the stationary clamp jaw and operatively connects the pivotal clamp jaw to the stationary clamp jaw to pivot about a pivot axis. The second guide surface moves relative to the first guide surface as the pivotal clamp jaw pivots about the pivot axis.

According to another aspect of this disclosure, a first side shield may be fixedly secured to a first side of the pivotal clamp jaw and a second side shield may be fixedly secured to a second side of the pivotal clamp jaw. The first side shield may extend over a first side of the pivotal clamp jaw and the second side shield may extend over a second side of the pivotal clamp jaw. The pivot pin may pivotally connect the first side shield to a first side of the stationary clamp jaw and may pivotally connect the second side shield to the second side of the stationary clamp jaw.

The first side shield and the second side shield may each have convex cylindrical ends that are generated about the pivot pin and enclose a protected area on the stationary clamp jaw that includes the first guide surface and the second guide surface. The first side shield may define a first blind hole facing the first side of the stationary clamp jaw and the second side shield may define a second blind hole facing the second side of the stationary clamp jaw. The pivot pin may extend outwardly from the first side of the stationary clamp jaw and second side of the stationary clamp jaw.

The first guide surface may be a convex cylindrical surface that is generated about the pivot pin and the second guide surface may be a concave cylindrical surface generated about the pivot pin. The concave cylindrical surface may at least partially cover the convex cylindrical surface when the first and second clamp jaws are closed.

An actuator may be pivotally connected to the stationary clamp jaw at a fixed location relative to the pivot axis. The actuator may also be pivotally connected to the pivotal clamp jaw to move in a range of locations disposed on an arc generated about the pivot axis.

The welding fixture clamp may be provided in combination with an L-bracket that is fixedly attached to the welding fixture to support the welding fixture clamp. Alternatively, the welding fixture clamp may be provided in combination with a robot with the welding fixture clamp functioning as an end effector of the robot.

According to another aspect of this disclosure, a clamp assembly is disclosed for a welding fixture that prevents the accumulation of weld splatter on surfaces of the clamp assembly that can interfere with opening and closing the clamp assembly. A first clamp jaw includes a convex guide surface. A second clamp jaw is pivotal about a pivot axis and includes a concave guide surface that slides over the convex guide surface when the second clamp jaw pivots about the pivot axis. A first side shield is secured to the first clamp jaw and extends partially over a first side of the second clamp jaw. A second side shield is secured to the first clamp jaw and extends partially over a second side of the second clamp jaw. A pivot pin connects the first clamp jaw to the first and second side shields. An actuator is attached to the first and second clamp jaws to open and close the clamp jaws by pivoting the second clamp jaw relative to the first clamp jaw.

According to another aspect of this disclosure, the first and second side shields may each have a blind hole facing the first and second sides of the second clamp jaw, and the pivot pin may extends outwardly from the first and second sides of the second clamp jaw.

According to another aspect of this disclosure, the first and second side shields may each have convex ends that enclose a protected area on the second clamp jaw that is centered relative to the axis.

According to another aspect of this disclosure, the convex guide surface may be a cylindrical guide surface generated about the pivot axis and the concave guide surface may be a cylindrical guide surface generated about the pivot axis.

According to another aspect of this disclosure, the convex cylindrical guide surface may be at least partially covered by the concave cylindrical guide surface when the first and second clamp jaws are closed.

According to another aspect of this disclosure, the actuator may be pivotally connected to the first clamp jaw at a fixed pivot point relative to the pivot axis. The actuator may be pivotally connected to the second clamp jaw at a location that moves through a range of locations that are disposed on an arc generated about the pivot axis.

According to another aspect of this disclosure, the clamp assembly may be provided in combination with a welding fixture, and may further comprise an L-bracket fixedly attached to the welding fixture.

According to another aspect of this disclosure, the clamp assembly may be provided in combination with a robot having a first end effector attachment part, and may further comprise a second end effector attachment part that is configured to be attached to the first end effector attachment part.

According to another aspect of this disclosure, the clamp assembly and supporting structures may be fabricated from nylon plates that resist the accumulation of weld splatter and are lighter weight.

These and other aspects of the disclosure will be more fully described with reference to the attached drawings in the following detailed description of the illustrated embodiments.

BRIEF DESCRIPTION OF THE DRAWINGS

FIG. 4 is a side elevation view of a closed automation clamp for a welding fixture;

FIG. 4A is a cross-sectional view taken along the line 4A-4A in FIG. 4;

FIG. 4B is a cross-sectional view taken along the line 4B-4B in FIG. 4;

FIG. 5 is a side elevation view of an open automation clamp for a welding fixture;

FIG. 7 is a side elevation view of a closed L-bracket automation clamp for a welding fixture; and FIG. 8 is a side elevation view of an open L-bracket automation clamp for a welding fixture.

DETAILED DESCRIPTION

The illustrated embodiments are disclosed with reference to the drawings. However, it is to be understood that the disclosed embodiments are intended to be merely examples that may be embodied in various and alternative forms. The figures are not necessarily to scale and some features may be exaggerated or minimized to show details of particular components. The specific structural and functional details disclosed are not to be interpreted as limiting, but as a representative basis for teaching one skilled in the art how to practice the disclosed concepts.

Figure 1:
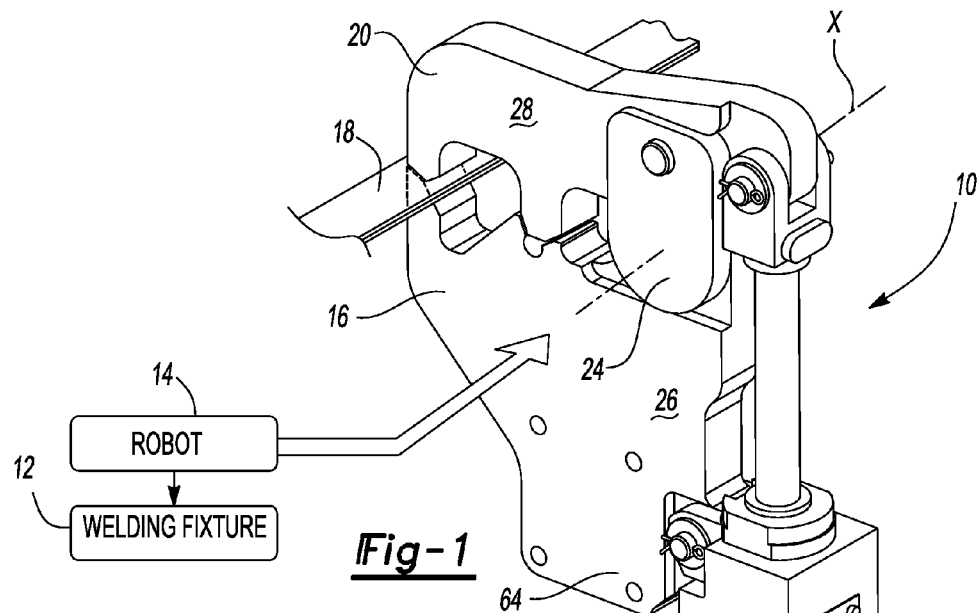
FIG. 1 is a rear/side perspective view of an automation clamp for a welding fixture.
Figure 2:
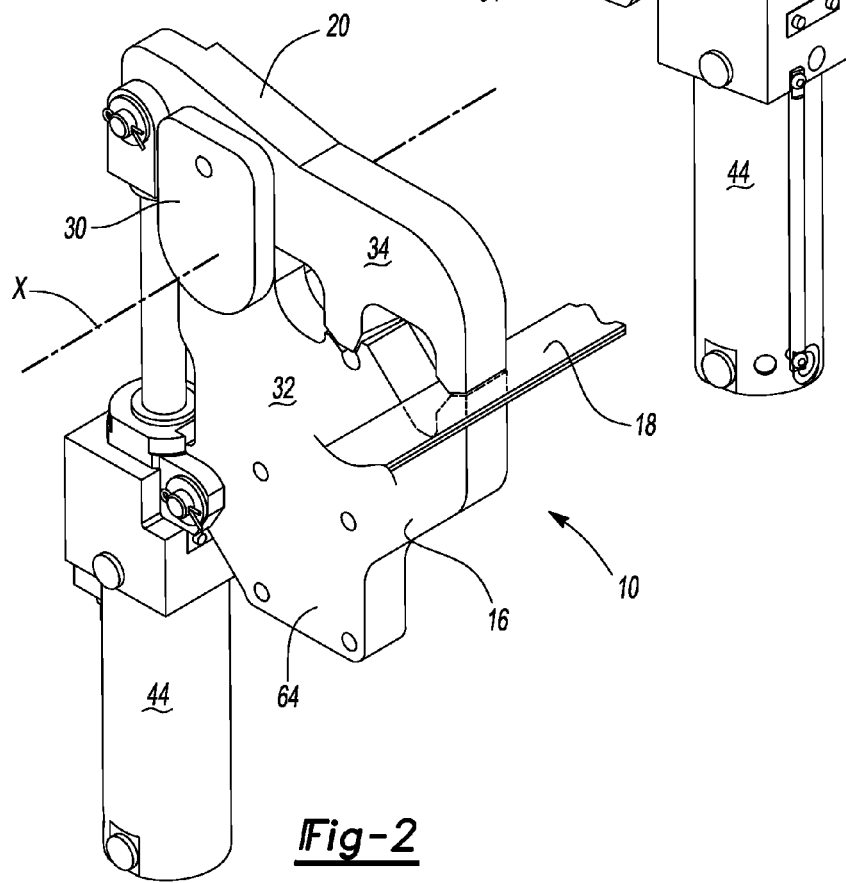
FIG. 2 is a front/side perspective view of an automation clamp for a welding fixture.

Referring to FIGS. 1 and 2, a clamp assembly is generally indicated by reference numeral 10. The clamp assembly 10 is intended primarily to be used in conjunction with a welding fixture 12, but may be used in other non-welding applications for holding parts together. The welding fixture 12 may have one or more robots 14 that are used to manipulate and position one or more clamp assemblies 10. The clamp assembly 10 may also be referred to as an end effector of the robot 14.

A first clamp jaw 16 engages a part 18 with a second clamp jaw 20. The first clamp jaw 16 and second clamp jaw 20 pivot relative to each other about a pivot axis X.

A first side shield 24 partially covers a first side 26 of the first clamp jaw 16. The first side shield 24 is secured to a first side 28 of the second jaw 20. With specific reference to FIG. 2, a second side shield 30 partially covers a second side 32 of the first clamp jaw 16. The second side shield 30 is secured to the second side 34 of the second jaw 20.

Figure 3:
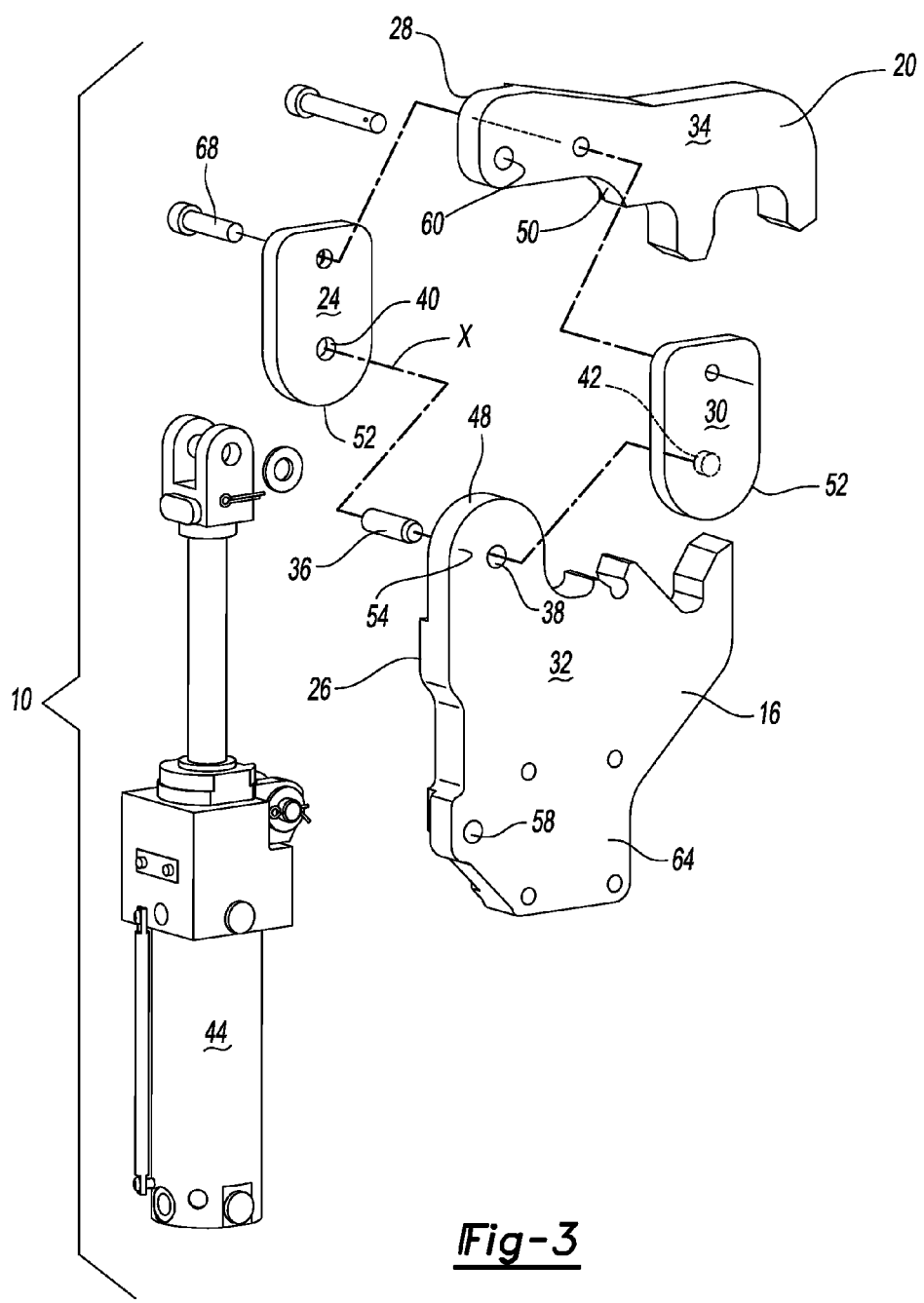
FIG. 3 is an exploded perspective view of an automation clamp for a welding fixture.

With continuing reference to FIGS. 1 and 2 and with particular reference to FIG. 3, the clamp assembly 10 is shown in an exploded perspective view. The first clamp jaw 16 and second clamp jaw 20 are pivotally connected at a pivot axis X. The first side shield 24 is connected to the first side 28 of the second clamp jaw 20. The second side shield 30 is connected to the second side 34 of the second jaw 20. The first side shield 24 and second side shield 30 extend toward and partially cover the first side 26 of the first clamp jaw 16 and the second side 32 of the first clamp jaw 16.

A pivot pin 36 is inserted to extend through a hole 38 formed in the first clamp jaw 16. The pivot pin 36 extends outwardly from both sides of the hole 38. The pivot pin 36 is received in a first blind hole 40 formed in the first side shield 24. The pivot pin 36 is also received in a second blind hole 42 formed in the second side shield 30.

An actuator 44, such as a hydraulic cylinder, a pneumatic cylinder, or the like is attached to the first clamp jaw 16 and second clamp jaw 20. The actuator 44 functions to pivot the second jaw 20 relative to the first clamp jaw 16.

The first clamp jaw 16 includes a convex guide surface 48 that is a circular surface generated about the pivot axis X. A concave guide surface 50 is provided on the second clamp jaw 20. The concave guide surface 50 moves relative to the convex guide surface 48. The guide surfaces 48, 50 are slightly spaced apart from each other (i.e., on the order of 1 mm) or the concave guide surface 50 may slide on the convex surface 48. When the clamp assembly 10 is closed, the second clamp jaw 20 covers the convex guide surface 48 with the concave guide surface 50 to prevent weld splatter from accumulating on the guide surfaces 48 and 50.

The first side shield 24 and second side shield 30 have convex ends 52. The convex ends 52 have a convex surface that is generated about the pivot axis X. A protected area 54 is provided on both sides of the first clamp jaw 16 that are shielded from weld splatter by the first side shield 24 and second side shield 30. The side shields 24, 30 also enclose the pivot pin 36 and protect the circular area 54, and guide surfaces 48 and 50 from weld splatter.

The actuator 44 is connected at a fixed pivot point 58 to the first clamp jaw 16. A pivot connector 60 connects the actuator 44 to the second clamp jaw 20. The pivot connector 60 moves in an arcuate path about the pivot axis X when the actuator 44 moves the second clamp jaw 20.

Referring to FIGS. 4, 4A, 4B and 5, operation of the clamp assembly 10 is explained in greater detail. With specific reference to FIG. 4, the clamp assembly 10 is shown in its closed position with the first clamp jaw 16 and second clamp jaw 20 clamped together by operation of the actuator 44. The first side shield 24 is attached to the first side 28 of the second clamp jaw 20. The first side shield 24 covers a portion of the first clamp jaw 16. The first side shield 24 is secured by a pin connector 68 to the second clamp jaw 20 and the second side shield 30.

Referring to FIG. 4A, the first and second side shields 24 and 30 are shown to be secured to the second clamp jaw 20 and first clamp jaw 16. The first and second side shields 24, 30 and the first and second clamp jaws 16, 20 are preferably formed from nylon plates or other similar plastic material that has sufficient durability and rigidity to function as a clamp. The plastic material used should resist damage or accumulation of weld splatter. Alternatively, the parts may be molded from a durable polymer or machined from other suitable materials. The side shields 24, 30 are shown as being assembled to the second clamp jaw 20 but, alternatively, one or both of the side shields 24, 30 could be molded with the clamp jaw 20 in one piece.

Pivot pin 36 is received in a hole 38 formed through the first clamp jaw 16. Pin 36 is received in the first and second blind holes 40, 42 formed in the first side shield 24 and second side shield 30, respectively. The side shields 24, 30 are secured by the pin connector 68 to the second clamp jaw 20. The pin connector 68 may be a nut and bolt, a pin and cotter pin connection, or the like.

Referring to FIG. 4B, the connection of the first clamp jaw 16 to the actuator is illustrated. A pivot connection 60 is used to connect the first clamp jaw 16 to the actuator 44. The pin connector 68 is shown connecting the first side shield 24 and second side shield 30 to opposite sides of the first clamp jaw 16.

Referring to FIG. 5, the clamp assembly 10 is shown in its open position with the second clamp jaw 20 being pivoted away from the first clamp jaw 16 by the actuator 44. The first side shield 24 is shown attached to the second clamp jaw 20 to overlap a part of the first clamp jaw 16. The second clamp jaw 20 is pivoted about the pivot axis X. The pin connection 60 to the actuator 44 is moved by the actuator in an arcuate path around the pivot axis X. Actuator 44 pivots about the fixed pivot point 58 on the first clamp jaw 16. The clamp assembly 10 is adapted to function as an end effector and may be connected to a robot (indicated in FIG. 1) at an end effector attachment area 64.

Figure 6:
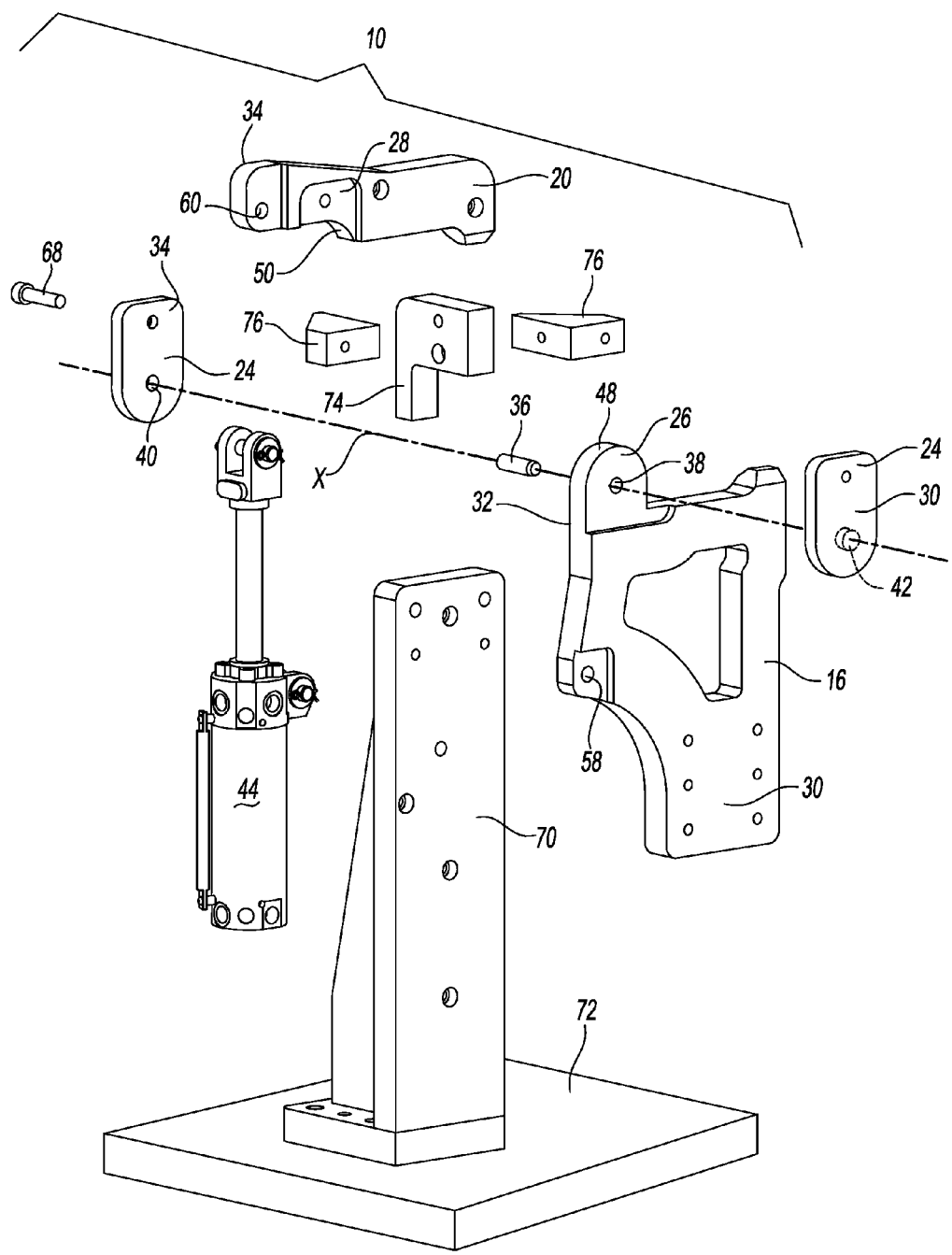
FIG. 6 is an exploded perspective view of an L-bracket automation clamp for a welding fixture.

Referring to FIGS. 6-8, the clamp assembly 10 is shown attached to an L-bracket 70 that is secured to a weld fixture base 72 or other part of a weld fixture. The L-bracket 70 holds the clamp assembly 10 in a fixed location on the welding fixture 12. The first clamp jaw 16 and second clamp jaw 20 are shown in their closed position in FIG. 7 and in their open position in FIG. 8. The second clamp jaw 20 pivots about the pivot axis X as it moves between the positions illustrated in FIGS. 7 and 8. The second side shield 30 is secured to the second clamp jaw 20 and covers the pivot pin 36 (shown in FIG. 6) that is received in the hole 38 in the first clamp jaw 16 and in the second blind hole 42 formed in the second side shield 30. The actuator 44 is extended to move the first clamp jaw 16 into engagement with the second clamp jaw 20 as shown in FIG. 7. The actuator 44 is refracted to pivot the first clamp jaw 16 relative to the second clamp jaw 20. An end stop 74 and locator 76 are provided on the second clamp jaw 20 to locate one or more parts 18 (shown in FIG. 1) to be clamped between the first clamp jaw 16 and the second clamp jaw 20.

The L-bracket 70 may be formed of nylon material. By forming the L bracket 70, the first clamp jaw 16 and second clamp jaw 20 from nylon, substantial weight savings can be obtained. Reducing the weight of the weld fixture 72 reduces the total weight of the weld fixture 72 and allows the fixture to be moved with conventional material handling and equipment and may eliminate the need to move the welding fixture 12 with a crane. In addition to the larger parts, the side shields 24, 30, end stop 74 and other locator 76 may also be formed of nylon to reduce the total weight of the welding fixture 12.

While exemplary embodiments are described above, it is not intended that these embodiments describe all possible forms of the disclosed apparatus and method. Rather, the words used in the specification are words of description rather than limitation, and it is understood that various changes may be made without departing from the spirit and scope of the disclosure as claimed. The features of various implementing embodiments may be combined to form further embodiments of the disclosed concepts.

What is claimed is:

1. A welding fixture clamp comprising:
a stationary clamp jaw that includes a first partially cylindrical guide surface;
a pivotal clamp jaw that includes a second partially cylindrical guide surface that conforms to and covers at least a part of the first partially cylindrical guide surface;
at least one side shield secured to one of the pivotal clamp jaw and the stationary clamp jaw and extending over the other one of the pivotal clamp jaw and the stationary clamp jaw to shield the first partially cylindrical guide surface and the second partially cylindrical guide surface;
a first pivot pin pivotally connects the side shield to the stationary clamp jaw about a pivot axis; and
a second pin connecting the side shield to the pivotal clamp jaw, wherein the pivotal clamp jaw is connected to the stationary clamp jaw to pivot about the pivot axis, and wherein the side shield partially covers a side of the stationary clamp jaw and the pivotal clamp jaw to shield the second partially cylindrical guide surface and the first partially cylindrical guide surface as the pivotal clamp jaw pivots about the pivot axis.

2. The welding fixture clamp of claim 1 wherein the at least one side shield further comprises a first side shield fixedly secured to a first side of the pivotal clamp jaw and a second side shield fixedly secured to a second side of the pivotal clamp jaw, wherein the first side shield extends over a first side of the pivotal clamp jaw and the second side shield extends over a second side of the pivotal clamp jaw, and wherein the pivot pin pivotally connects the first side shield to a first side of the stationary clamp jaw and pivotally connects the second side shield to the second side of the stationary clamp jaw.

3. The welding fixture clamp of claim 2 wherein the first side shield and the second side shield each have convex cylindrical ends that are generated about the pivot pin and cover the first and second sides of the jaws proximate the first partially cylindrical guide surface and the second partially cylindrical guide surface.

4. The welding fixture clamp of claim 2 wherein the first side shield defines a first blind hole facing the first side of the stationary clamp jaw and second side shield defines a second blind hole facing the second side of the stationary clamp jaw, and wherein the pivot pin extends outwardly from the first side of the stationary clamp jaw and second side of the stationary clamp jaw, and wherein the blind holes receive the portions of the pivot pin extending outwardly from the stationary clamp jaw.

5. The welding fixture clamp of claim 1 wherein the first partially cylindrical guide surface is a convex surface that is generated about the pivot pin and the second partially cylindrical guide surface is a concave surface generated about the pivot pin.

6. The welding fixture clamp of claim 5 wherein the concave cylindrical surface partially covers the convex cylindrical surface when the stationary clamp jaw and pivotal clamp jaw are closed.

7. The welding fixture clamp of claim 1 further comprising an actuator pivotally connected to the stationary clamp jaw at a fixed location relative to the pivot axis, and wherein the actuator is pivotally connected to the pivotal clamp jaw.

8. The welding fixture clamp of claim 1 in combination with a welding fixture, further comprising an L-bracket fixedly attached to the welding fixture to support the welding fixture clamp.

9. The welding fixture clamp of claim 1 in combination with a robot, wherein the welding fixture clamp is an end effector of the robot.

10. A clamp assembly comprising:
a first clamp jaw including a convex guide surface;
a second clamp jaw pivotal about a pivot axis and including a concave guide surface that slides over the convex guide surface to shield the guide surfaces from weld splatter when the second clamp jaw pivots about the pivot axis;
a first side shield secured to the second clamp jaw and extending partially over a first side of the first clamp jaw to cover a first side of the convex and concave guide surfaces;
a second side shield secured to the second clamp jaw and extending partially over a second side of the first clamp jaw to cover a second side of the convex and concave guide surfaces;
a pivot pin connecting the first clamp jaw to the first and second side shields;
a pin connector connecting the second clamp jaw to the first and second side shields; and
an actuator attached to the first and second clamp jaws that opens and closes the clamp jaws by pivoting the second clamp jaw relative to the first clamp jaw.

11. The clamp assembly of claim 10 wherein the first side shield defines a first blind hole facing the first side of the first clamp jaw and second side shield defines a second blind hole facing the second side of the second clamp jaw, and wherein the pivot pin has a first end that extends outwardly from the first side of the first clamp jaw and is received in the first blind hole and a second end that extends outwardly from the second side of the first clamp jaw and is received in the second blind hole.

12. The clamp assembly of claim 11 wherein the first and second side shields each have convex ends that enclose a protected area on the second clamp jaw that is centered relative to the axis.

13. The clamp assembly of claim 10 wherein the convex guide surface is a partially cylindrical surface generated about the pivot axis and the concave guide surface is a partially cylindrical surface generated about the pivot axis.

14. The clamp assembly of claim 13 wherein the concave guide surface partially covers the convex guide surface when the first and second clamp jaws are closed.

15. The clamp assembly of claim 10 wherein the actuator is pivotally connected to the first clamp jaw at a fixed pivot point relative to the pivot axis, and wherein the actuator is pivotally connected to the second clamp jaw by a pivot connector that moves in an arcuate path.

16. The clamp assembly of claim 10 in combination with a welding fixture, further comprising an L-bracket fixedly attached to the welding fixture.

17. The clamp assembly of claim 10 in combination with a robot having a first end effector attachment part, wherein the clamp assembly further comprises a second end effector attachment part that is configured to be attached to the first end effector attachment part.

* * * * *

UNITED STATES PATENT AND TRADEMARK OFFICE
CERTIFICATE OF CORRECTION

| | | |
|---|---|---|
| PATENT NO. | : 9,132,515 B2 | Page 1 of 1 |
| APPLICATION NO. | : 13/973188 | |
| DATED | : September 15, 2015 | |
| INVENTOR(S) | : Spillane et al. | |

It is certified that error appears in the above-identified patent and that said Letters Patent is hereby corrected as shown below:

In the Claims

Column 6, Line 48, Claim 4:

After "stationary clamp jaw and"
Insert -- the --.

Signed and Sealed this
Ninth Day of February, 2016

Michelle K. Lee
*Director of the United States Patent and Trademark Office*